(12) United States Patent
Cawley et al.

(10) Patent No.: US 9,163,489 B2
(45) Date of Patent: Oct. 20, 2015

(54) FLUID INJECTION

(75) Inventors: Stephen John Cawley, Aberdeen (GB);
Hrvoje Galic, Aberdeen (GB); John Nigel Ellis Mason, Aberdeen (GB)

(73) Assignee: BP Alternative Energy International Limited (GB)

( * ) Notice: Subject to any disclaimer, the term of this patent is extended or adjusted under 35 U.S.C. 154(b) by 824 days.

(21) Appl. No.: 13/256,314

(22) PCT Filed: Mar. 10, 2010

(86) PCT No.: PCT/GB2010/000433
§ 371 (c)(1),
(2), (4) Date: Sep. 13, 2011

(87) PCT Pub. No.: WO2010/103275
PCT Pub. Date: Sep. 16, 2010

(65) Prior Publication Data
US 2012/0003043 A1    Jan. 5, 2012

(30) Foreign Application Priority Data
Mar. 13, 2009 (EP) .................................... 09250710

(51) Int. Cl.
*E21B 43/16* (2006.01)

(52) U.S. Cl.
CPC ............... *E21B 43/164* (2013.01); *Y02C 10/14* (2013.01)

(58) Field of Classification Search
CPC ..... Y02C 10/14; H02M 10/14; E21B 43/164; E21B 43/166; E21B 44/005
USPC ............... 166/402, 272.6, 263, 268, 400, 401
See application file for complete search history.

(56) References Cited

U.S. PATENT DOCUMENTS 3,993,129 A * 11/1976 Watkins ..................... 166/319
4,050,516 A *  9/1977 Canterbury ............... 166/305.1
(Continued)

FOREIGN PATENT DOCUMENTS

EP    1 504 822 A1    2/2005
EP    1 519 005       3/2005
(Continued)

OTHER PUBLICATIONS

International Search Report for PCT/GB2010/000433, mailed May 3, 2010.
(Continued)

*Primary Examiner* — Brad Harcourt
*Assistant Examiner* — Steven MacDonald
(74) *Attorney, Agent, or Firm* — Gunnar Heinisch

(57) ABSTRACT

A method is described of injecting CO2 into an aquifer or a depleted hydrocarbon reservoir (211) via at least one injection well (202) that penetrates said aquifer or reservoir, wherein the injection well is provided with an injection tubing (203) that is in sealing engagement with the injection well. The injection tubing terminates at or immediately above the interval of the aquifer or the reservoir into which the CO2 is to be injected and the injection tubing is provided with a fluid injection control valve (208) at or near the bottom thereof which is closed or closes when the pressure above the valve is less than a pre-set pressure value and opens or reopens when the pressure above the valve is at or greater than said pre-set pressure value, the pre-set pressure value being selected such that the CO2 in the injection tubing is maintained in a liquid or supercritical state.

17 Claims, 3 Drawing Sheets

(56) References Cited

U.S. PATENT DOCUMENTS

| | | | | |
|---|---|---|---|---|
| 4,371,038 | A | * | 2/1983 | Abernathy et al. ............ 166/380 |
| 4,372,386 | A | | 2/1983 | Rhoades et al. |
| 5,099,921 | A | * | 3/1992 | Puri et al. ...................... 166/266 |
| 5,865,248 | A | * | 2/1999 | Riese et al. .................... 166/263 |
| 5,992,521 | A | * | 11/1999 | Bergren et al. ................ 166/265 |
| 6,666,271 | B2 | | 12/2003 | Deaton et al. |
| 7,640,992 | B2 | | 1/2010 | Jurczyk et al. |
| 8,622,129 | B2 | * | 1/2014 | Collins et al. ................. 166/266 |
| 8,646,538 | B2 | * | 2/2014 | Baxter ........................... 166/402 |
| 2003/0205389 | A1 | | 11/2003 | Deaton et al. |
| 2007/0295512 | A1 | * | 12/2007 | Jurczyk et al. ................ 166/374 |
| 2008/0210898 | A1 | * | 9/2008 | Hedding ........................ 251/336 |
| 2009/0065213 | A1 | | 3/2009 | Burnett |
| 2009/0250224 | A1 | | 10/2009 | Wright et al. |
| 2010/0000737 | A1 | * | 1/2010 | Ramakrishnan et al. ..... 166/297 |
| 2010/0071896 | A1 | | 3/2010 | Christie et al. |
| 2010/0300703 | A1 | | 12/2010 | Christie et al. |
| 2010/0301242 | A1 | | 12/2010 | Patton et al. |
| 2011/0120727 | A1 | | 5/2011 | Lake et al. |
| 2011/0120728 | A1 | | 5/2011 | Lake et al. |

FOREIGN PATENT DOCUMENTS

| | | |
|---|---|---|
| EP | 1 519 005 A1 | 3/2005 |
| GB | 669216 | 3/1952 |
| GB | 669216 A | 3/1952 |
| GB | 2 410 966 | 8/2005 |
| GB | 2 410 966 A | 8/2005 |
| GB | 2 423 780 | 9/2006 |
| GB | 2 423 780 A | 9/2006 |
| GB | 2 439 399 A | 12/2007 |
| GB | 2 454 356 A | 5/2009 |
| JP | 2004-3326 A | 1/2004 |
| JP | 2004-003326 | 1/2008 |
| WO | WO 03/022409 | 3/2003 |
| WO | WO 03/022409 A1 | 3/2003 |
| WO | WO 2005/022012 A1 | 3/2005 |
| WO | WO 2006/048629 A1 | 5/2006 |
| WO | WO 2006/090168 A1 | 8/2006 |
| WO | WO 2006/095160 A1 | 9/2006 |
| WO | WO 2007/089933 A1 | 8/2007 |
| WO | WO 2009/047552 A2 | 4/2009 |
| WO | WO 2009/050503 A2 | 4/2009 |
| WO | WO 2009/090367 A1 | 7/2009 |
| WO | WO 2009/098498 A1 | 8/2009 |
| WO | WO 2010/007403 A1 | 1/2010 |
| WO | WO 2010/052502 A1 | 5/2010 |
| WO | WO 2010/064053 A1 | 6/2010 |
| WO | WO 2011/011306 A1 | 1/2011 |

OTHER PUBLICATIONS

Written Opinion of the International Searching Authority for PCT/GB2010/000433, mailed May 3, 2010.

* cited by examiner

Critical point 74 bara, 31°C (1071 psia, 88°F)

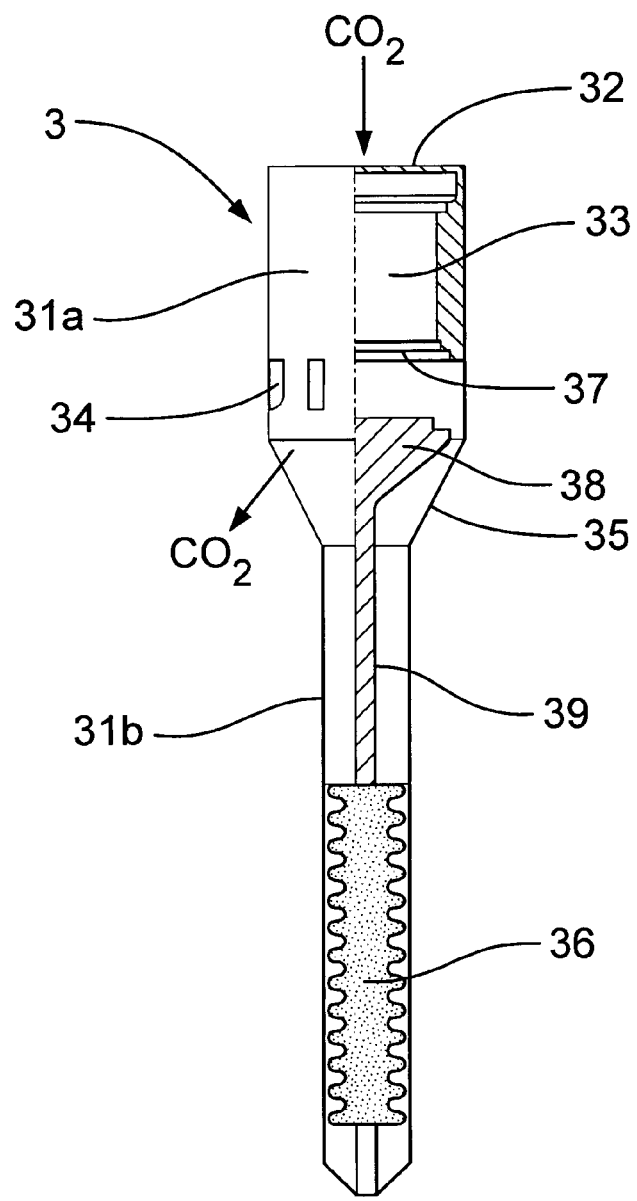

FLUID INJECTION

This application is the U.S. national phase of International Application No. PCT/GB2010/000433 filed 10 Mar. 2010 which designated the U.S. and claims priority to EP Patent Application No. 09250710.2 filed 13 Mar. 2009, the entire contents of each of which are hereby incorporated by reference.

The invention relates to methods and apparatus for the injection of low temperature fluids into low pressure hydrocarbon reservoirs or into low pressure aquifers. In particular, the invention relates to the injection of carbon dioxide ($CO_2$) into a porous and permeable subterranean hydrocarbon reservoir, in particular, a depleted gas reservoir, for storage of the $CO_2$ therein.

$CO_2$ is a gas produced as a by-product, in large quantities, in certain industrial operations, e.g. the manufacture of ammonia, in power plants that burn fossil fuels such as coal, oil or gas, and in a hydrogen plant that produces hydrogen by reforming of a hydrocarbon feedstock. Release of this by-product into the atmosphere is undesirable as it is a greenhouse gas. Much effort has been made towards the development of methods for the disposal of $CO_2$ in a way other than release to the atmosphere. One technique of particular interest is subsurface disposal of $CO_2$ into porous strata.

Accordingly, subterranean hydrocarbon reservoirs may be suitable for subsurface disposal of $CO_2$. When $CO_2$ is injected into a porous and permeable hydrocarbon reservoir, the injected $CO_2$ may beneficially serve to drive hydrocarbons (e.g. oil) in the reservoir towards a production well (a well from which hydrocarbons are extracted), thereby achieving enhanced hydrocarbon recovery and sequestration of the $CO_2$.

It is also envisaged that depleted oil and gas fields may present an opportunity for $CO_2$ storage. Typically, an oil or gas field may comprise a plurality of reservoirs. A field or reservoir may be depleted if hydrocarbon production has decreased the reservoir pressure below its initial (pre-production) value, whilst the field or reservoir is still producing hydrocarbons. A field or reservoir may also be depleted if oil and/or gas is no longer being produced from it (i.e. the production wells are shut-in or are abandoned); the space within the rock formation of the reservoir that was previously occupied by oil and/or gas before it was produced may provide space in which $CO_2$ can be sequestered. Depleted reservoirs may be found in onshore or offshore fields.

It is known to provide a system for injecting a fluid, e.g. water, into a hydrocarbon reservoir, wherein the system comprises an injection tubing in sealing relationship with the wall of an injection well. A pumping facility pumps fluid along a pipeline to a wellhead and into the injection tubing. A surface choke is provided to regulate the flow of pumped fluid from the pipeline into the injection tubing. A downhole safety valve may be provided within the injection tubing.

However, it may be difficult to inject $CO_2$ into a depleted field or reservoir due to the phase change behaviour of $CO_2$ under low reservoir pressure conditions, e.g. as are typically associated with depleted gas fields.

The phase behaviour of $CO_2$ can be understood with reference to the phase diagram shown in FIG. 1. This phase diagram shows the areas where $CO_2$ exists as a gas, liquid, solid or as a supercritical fluid. The curves represent the temperatures and pressures where two phases coexist in equilibrium (at the triple point, the solid, liquid and gas phases coexist). The gas-liquid coexistence curve is known as the boiling curve. On moving upwards along the boiling curve (increasing both temperature and pressure), liquid becomes less dense due to thermal expansion and the gas becomes more dense as the pressure rises. Eventually, the densities of the two phases converge and become identical, the distinction between gas and liquid disappears, and the boiling curve comes to an end at the critical point. The critical point for $CO_2$ occurs at a pressure of 718 bara (1070.3 psia) ($P_c$) and a temperature of 31.1° C. ($T_c$). When liquid $CO_2$ is above its critical temperature ($T_c$) and critical pressure ($P_c$) it is a supercritical fluid. When $CO_2$ is below its critical temperature and above its critical pressure, it is either in a liquid or solid state (depending upon its temperature and pressure).

It is generally desired that the sequestered $CO_2$ is in a state which maximises storage, in particular, is in the form of a high density material (a liquid or supercritical fluid) that has the maximum number of moles of $CO_2$ per unit volume. Accordingly, it may be preferred for the $CO_2$ to be injected into (and subsequently stored in) the reservoir in either a liquid or supercritical state.

However, a depleted hydrocarbon reservoir may have an initial reservoir pressure of less than 1000 psia (69 bara), in particular, less than 500 psia (34 bara), for example, a pressure of 200 to 300 psia (14 to 21 bara). As will be appreciated, at the temperatures typically experienced within an injection well (for example, temperature of 0 to 100° C.), such pressures are below the critical pressure for $CO_2$. Accordingly, the injected liquid or supercritical $CO_2$ may change into the gaseous state within the injection well, possibly within the injection tubing, if the pressure in the injection well falls to below the critical pressure for $CO_2$.

For instance, a problem will occur if the injection well is capable of taking more fluid than is being delivered to the injection well. In the case of a water injection well, this problem would be solved by reducing the injection pressure at the wellhead to maintain injection system stability (referred to as "choking-back" the well). However, for injection of $CO_2$ there is a limit to the extent to which a well may be choked back at the wellhead as a fall in wellhead pressure to below about 45 bara (652.7 psia) (at ambient temperature conditions) will result in the $CO_2$ undergoing a phase change into a gaseous state immediately downstream of the wellhead. Such a phase change would generally be undesirable, since a phase change from the liquid to the gaseous state may result in a significant change in the fluid density and hence a significant change in pressure across the choke. For example, the pressure gradient across the choke may fall ten-fold (for example, from 0.35 psi/ft to 0.035 psi/ft), potentially causing injection instability.

It will therefore be appreciated that simply choking back an injection system is unlikely to result in stable injection of $CO_2$ into a depleted gas reservoir. For instance, even if the pressure is maintained above about 45 para (652.7 psia) (under ambient conditions) at the wellhead so as to avoid the liquid-to-gas phase change, then the reservoir pressure may still be low enough that the injected $CO_2$ may expand and undergo a phase transition into a gaseous state within the injection tubing or well.

In a known injection system as described above, another significant problem may occur with $CO_2$ injection during start-up. Typically. liquid $CO_2$ may be pumped at a pressure of around 70 bars (1015.3 psia). Very low reservoir pressures (e.g. 200-300 psia; 14-20 bara) will result in a very low wellhead pressure; for instance, the initial injection pressure at the wellhead may be about 45 bars (652.7 psia). Accordingly, there may be a significant pressure drop across the choke, for example, a drop in pressure from 70 to 10 bara (1015.3 to 145 psia), during the start-up of liquid $CO_2$ injection. Owing to the Joule-Thompson effect such a pressure drop will be accompanied by a decrease in temperature, which may be such that the $CO_2$ undergoes a phase change into a solid state (dry ice), which may hinder fluid flow through the pipeline. Accordingly, it will be appreciated that there is a not insignificant risk, of dry ice formation in the injection well during start-up of injection of $CO_2$ into a depleted reservoir. The same problem may manifest itself on a resumption of $CO_2$ injection into a well after a period in which the well has been shut in, since low reservoir pressure may result in a low shut-in wellhead pressure, which may present a heightened risk of dry ice formation.

The person skilled in the art will appreciate that it is also important to maintain a stable column of liquid or supercritical $CO_2$ within the injection tubing, as the hydrostatic head pressure associated with this column provides a significant contribution to the downhole pressure.

The present invention addresses the problem of ensuring efficient injection of $CO_2$ into a depleted reservoir whilst maintaining a stable column of liquid or supercritical fluid $CO_2$ in the injection tubing. It also seeks to substantially reduce or avoid deposition of solid $CO_2$ at the wellhead or immediately downstream thereof during $CO_2$ injection.

Thus, according to the present invention there is provided a method of injecting $CO_2$ into an aquifer or a depleted hydrocarbon reservoir via at least one injection well that penetrates said aquifer or reservoir, wherein the injection well is provided with an injection tubing that is in sealing engagement with the injection well and wherein the pressure of the aquifer or the reservoir pressure of the depleted hydrocarbon reservoir is less than the critical pressure of $CO_2$, which method comprises operating an injection facility to inject a $CO_2$ stream down the injection tubing of the injection well at above the critical pressure of $CO_2$, the stream being in a liquid state or a supercritical state;

characterised in that the injection tubing terminates at or immediately above the interval of the aquifer or the reservoir into which the $CO_2$ is to be injected and the injection tubing is provided with a fluid injection control valve at or near the bottom thereof which is closed or closes when the pressure above the valve is less than a pre-set pressure value and opens or reopens when the pressure above the valve is at or greater than said pre-set pressure value, the pre-set pressure value being selected such that the $CO_2$ in the injection tubing is maintained in a liquid or supercritical state.

Typically, the fluid injection control valve is a one-way valve, for example, a valve that incorporates a resiliently-biased element that actuates a valve element such that the valve opens at or above the pre-set pressure value and closes below this pre-set pressure value. Typically, the resiliently-biased member comprises a nitrogen dome or a spring, for example a metal spring.

It will be understood that the method can be used with any appropriate valve that incorporates a resiliently-biased element that actuates a valve element such that the valve opens at or above the pre-set pressure value and closes below this pre-set pressure value. In particular, aspects of the invention are not restricted to the use of particular valves or types of valve shown in the figures and described below.

Preferably the valve includes a movable member, movable between a closed position in which it effects closing of the valve, and an open position in which the valve is open. Preferably the member is arranged such that in use the $CO_2$ stream applies a force directly to a part of the movable member. If the applied force is above a threshold, the movable member is moved to an open position, or remains in the open position; if the applied force is below the threshold, the movable member remains in the closed position, or is moved to the closed position. Preferably the movable member is biased to the closed position.

The pre-set pressure value for the one-way valve is dependent upon the static head pressure of the column of liquid or supercritical $CO_2$ in the injection tubing of the injection well which in turn is dependent on the depth of the aquifer or the depleted hydrocarbon reservoir which is penetrated by the injection well. Typically, the pre-set pressure value may be in the range of 200 to 300 bara (2900 to 4351 psia), preferably, 225 to 275 bara (3263 to 3989 psia), for example, 240 to 255 bara (3481 to 3698 psia).

Advantageously, use of the fluid injection control valve prevents the injected liquid or supercritical fluid $CO_2$ from undergoing a phase transition into a gaseous state in the injection tubing above the valve.

Further, the fluid injection control valve may act to maintain the pressure at the wellhead above a pressure of, say 45 bara (653 psia), thereby reducing any pressure drop across the choke and consequently reducing the risk of dry ice formation.

The fluid injection control valve may also reduce or substantially eliminate the need to choke back the flow of pumped fluid during the initial stages of injection.

Typically, the $CO_2$ that is to be sequestered will be delivered to an injection facility at a pressure in the range of 75 to 250 bara (1088 to 3626 psia), and at ambient temperature, for example, a temperature in the range of 0 to 40° C., typically, 0 to 20° C. Accordingly, during delivery, the $CO_2$ will be in either a liquid or a supercritical state, It is more efficient to deliver a liquid or supercritical fluid to the injection facility of an aquifer or hydrocarbon reservoir than gaseous $CO_2$ as there is no requirement for compressors. Instead, the liquid or supercritical $CO_2$ may be pumped to pipeline delivery pressure.

The pressure drop in the pipeline may be low, for example, a pressure drop of less than 25 psia (1.7 bara). Hence, the $CO_2$ may reach the injection facility of the aquifer or hydrocarbon reservoir at substantially the pipeline delivery pressure. The person skilled in the art will understand that the extent of any pressure drop in the pipeline will depend on factors such as changes in ambient temperature along the length of the pipeline, pipeline length, and the topography traversed by the pipeline.

If necessary, the injection facility may comprise at least one pump in order to boost the pressure of the $CO_2$ to the desired injection pressure.

Typically, the injection tubing is run into the injection well to a position adjacent or immediately above the interval of the aquifer or the reservoir into which the $CO_2$ is to be injected. It is envisaged that the injection tubing may have an internal diameter in the range of 3 to 7.0 inches (7.6 to 17.78 cm), preferably 4 to 5.5 inches (10.2 to 13.97 cm).

If there should be an annular space between the injection tubing and the wall of the injection well, it will be necessary to seal it. Preferably, a packer may be provided at or near the bottom of the injection tubing for this purpose.

The person skilled in the art will understand that the downhole pressure in the injection well has two components: (a) the well-head pressure; and (b) the static head or the weight of the column of liquid $CO_2$ or supercritical $CO_2$ in the injection well.

Accordingly, it is generally desired that a column of liquid or supercritical fluid $CO_2$ is maintained in the injection tubing of an injection well as the head pressure of this column of fluid will contribute to the pressure in the injection well adjacent the depleted hydrocarbon reservoir. Hence, it is an advantage of the present invention that the fluid in the injection tubing above the fluid injection control valve is maintained in a liquid or supercritical state such that the column of fluid has a significant pressure head.

It will be appreciated that the static head of a column of a dense fluid such as liquid $CO_2$ or supercritical $CO_2$ is significantly higher than that of a column of gaseous $CO_2$ such that a lower wellhead pressure may be used than if gaseous $CO_2$ was being injected down the wellbore. Accordingly, the process of the present invention may reduce injection costs by reducing or eliminating any risk of the $CO_2$ in the injection tubing undergoing a phase change into a gaseous state.

The hydrocarbon reservoir may be any geological structure, strata, oil sand, reservoir rock etc in which oil, gas or gas condensate has naturally accumulated. Typically, a plurality of injection wells and a plurality of production wells penetrate the hydrocarbon reservoir. The production wells may remain in production during injection of the $CO_2$ into the depleted reservoir. Alternatively, the production wells may be shut-in or abandoned. It is also envisaged that at least some of the production wells, preferably, all of the production wells, may be converted to injection wells and the remainder of the production wells may be shut-in or abandoned. In the case of $CO_2$ injection into a low pressure aquifer, in most situations there would be only injection wells.

Typically, $CO_2$ may be injected into an oil or gas reservoir until the reservoir pressure has built up to the original reservoir pressure. Where the oil or gas reservoir remains in production, the injection wells and production wells may then be abandoned and the emplaced volume of $CO_2$ is therefore sequestered. Of course, if the reservoir is no longer producing hydrocarbon, then any production wells may have been shut-in or abandoned prior to initiating injection of $CO_2$ or may have been converted into injection wells.

Where $CO_2$ is injected into a low pressure aquifer, the pressure in the aquifer should not be allowed to build up to such as high a value that the aquifer is unable to contain the $CO_2$ after the injection wells have been shut-in or abandoned. Thus, the final pressure in the aquifer will be dependent upon the geology of the rock strata, in particular, the rock strata that caps the aquifer.

The person skilled in the art will understand that once $CO_2$ injection has caused the pressure in a near wellbore region of the aquifer or reservoir to increase to a value of above ca. 1000 psia (ca. 69 bara), then the fluid injection control valve may be removed from the injection tubing as there is no longer a significant risk that the $CO_2$ in the injection tubing will undergo a phase transition into a gaseous state. However, the fluid injection control valve should only be removed if there is no risk of the pressure in the near wellbore region of the aquifer or reservoir dissipating and therefore falling to a value of less than ca. 1000 psia. (ca. 69 bara) This threshold pressure value will be dependent on the reservoir temperature or the temperature of the aquifer.

Accordingly, the fluid injection control valve is, preferably, wireline retrievable.

Preferably, the fluid injection flow control valve may seat, in use, in a nipple provided in the injection tubing.

The imported $CO_2$ stream may be injected down one or more existing injection wells (for example, a water injection well or water alternating gas (WAG) injection well) and/or converted production wells that have been modified by providing a flow control valve at or near the bottom of an injection tubing and/or into one or more injection wells that have been specifically designed for the injection of the imported $CO_2$ stream having a flow control valve at or near the bottom of the injection tubing.

The imported $CO_2$ stream may be a by-product stream from a power station (for example, is recovered from a flue gas) or may be a by-product from a hydrogen plant (for example, is separated from a stream comprising hydrogen and $CO_2$ where the hydrogen is subsequently used to generate electricity in a power station). The imported $CO_2$ stream may also have been derived from a natural gas plant where $CO_2$ is separated from a natural gas product stream. In addition, the imported $CO_2$ may be a by-product of the manufacture of ammonia.

It will be appreciated that aspects of the invention may be applicable to any $CO_2$ stream, independent of its origins.

The imported $CO_2$ stream preferably comprises at least 95% for example at least 98% $CO_2$ on a dry basis. Thus, the imported $CO_2$ stream may comprise trace amounts of additional components selected from hydrogen, carbon monoxide, nitrogen and mixtures thereof. For example, where the imported $CO_2$ stream is obtained from a hydrogen plant, the additional components are mostly hydrogen and carbon monoxide. Typically, the amount of hydrogen in the imported $CO_2$ stream is less than 1% by weight.

Although the imported $CO_2$ stream is not necessarily a single component stream, the amount of impurities in the imported $CO_2$ stream in many examples is so low that the phase behaviour of this stream is similar to that of pure $CO_2$. In other examples, the amount of impurities in the $CO_2$ stream may be higher.

It will be understood that aspects of the present invention are applicable to any appropriate $CO_2$ stream, independent of the composition of the stream. It is anticipated that the stream will include at least 90%, preferably at least 95%, preferably at least 98% $CO_2$. However, the invention may be applied in respect of streams having a lower $CO_2$ content. For example, the content may be 80%, 70% or even lower. However, it is considered unlikely to be economically advantageous in many examples for such low $CO_2$— content streams to be injected into a depleted reservoir. Preferably, the $CO_2$ stream includes at least 95 mol % $CO_2$. However, in most cases, the mol % of $CO_2$ in the stream will not affect the injection method.

Where the imported $CO_2$ is at below the desired well-head pressure, it may be fed to an injection pump or pumps (e.g. one, two, three or four pumps in series) of the injection facility to bring it to the desired well-head pressure. Preferably, the imported $CO_2$ may be sent to a manifold that can divert the $CO_2$ to one or more injection wells and into the aquifer or reservoir.

As is well known to the person skilled in the art, the average pressure of an aquifer or hydrocarbon reservoir (and hence the required down-hole pressure for injecting the $CO_2$ stream into the aquifer or hydrocarbon reservoir) varies depending upon the depth of the reservoir and the type of rock, among other things. For example, the down-hole pressure will be higher the deeper the aquifer or hydrocarbon reservoir. Generally stated, the average pressure of the hydrocarbon reservoir is controlled by the pressure of the injection well and the pressure of the production well (when the reservoir remains in production). Generally, it is necessary to ensure that the down-hole pressure in the injection well is maintained at a pressure value above the average pressure of the aquifer or hydrocarbon reservoir in order to ensure that the $CO_2$ is injected into the aquifer or reservoir.

According to an aspect of the invention there is provided a system for injecting $CO_2$ into an aquifer or a depleted hydrocarbon reservoir, the system comprising: an injection well that penetrates the reservoir or aquifer, the injection well being provided with an injection tubing that is in sealing engagement with the wall of the injection well at or near the bottom of the injection tubing; a fluid injection interval located within the injection well, proximal to the hydrocarbon reservoir or aquifer; an injection facility for pumping a $CO_2$ stream comprising liquid or supercritical $CO_2$ into the injection well and down the injection tubing; characterised in that the injection tubing terminates within or immediately above the fluid injection interval and the system further comprises a fluid injection control valve located within the injection tubing at or near the bottom thereof, the fluid injection control valve being adapted to be closed or to close when the pressure above the valve is less than a pre-set pressure value and to be open or to reopen when the pressure above the valve is at or greater than said pre-set pressure value, the pre-set pressure value being selected such that the $CO_2$ in the injection tubing is maintained in a liquid or supercritical state.

According to another aspect of the invention there is provided a system for injecting $CO_2$ into a low pressure hydrocarbon reservoir or a low pressure aquifer comprising:
an injection well that penetrates the reservoir or aquifer, the injection well being provided with an injection tubing that is in sealing engagement with the wall of the injection well;
a fluid injection interval located within the injection well, proximal to the hydrocarbon reservoir or aquifer;
an injection facility for pumping a $CO_2$ stream comprising liquid or supercritical $CO_2$ into the injection well and down the injection tubing;
characterised in that the injection tubing terminates within or immediately above the fluid injection interval and the system further comprises a fluid injection control valve located within the injection tubing at or near the bottom thereof, the fluid injection control valve comprising a valve closure element, a valve seat and an actuating means wherein the actuating means provides a biasing force to the valve closure element which force is capable of being counteracted or exceeded by the force applied to the valve closure element by a column of liquid or supercritical $CO_2$ in the injection tubing and wherein the valve closes, in use, when the force applied by the column of liquid or supercritical $CO_2$ in the injection tubing is less than the biasing force provided by the actuating means such that the valve closure element is urged by the actuating means into engagement with the valve seat, thereby preventing the injected $CO_2$ from reaching the fluid injection interval of the injection well, and the valve opens, in use, when the force applied by the column of liquid or supercritical $CO_2$ in the injection tubing is greater than or equal to the biasing force.

The biasing force that is provided by the valve actuating means is selected such that the valve closes at a pre-determined or pre-set pressure value, this pre-determined value being selected such that the $CO_2$ in the injection tubing is maintained in a liquid or supercritical state.

Typically, the injection tubing is provided with a sealing means, for example, a packer, that seals the annular space between the injection tubing and the wall of the injection well.

The injection well may be lined with a casing. A portion of the casing surrounding the fluid injection region may be provided with perforations to permit fluid communication between the well and the reservoir. Alternatively, the injection well may have an open-hole completion.

The injection facility may be located on the surface, e.g. on land or a platform at sea. Alternatively, the injection facility may be located in a subsea location. The $CO_2$ is delivered from the injection facility to the injection well via an injection flowline. Typically, the injection well is provided with a wellhead and the injection flowline terminates at the wellhead.

The $CO_2$ may arrive at the injection facility at the desired delivery pressure. Alternatively, the injection facility may be provided with one or more booster pumps for raising the pressure of the $CO_2$ to the desired delivery pressure.

The system may comprise at least one downhole safety valve.

The system may comprise a choke valve, typically located in the wellhead.

According to another aspect of the invention there is provided a fluid injection control valve for use downhole comprising:
a body having an inlet and an outlet;
valve means between the inlet and the outlet, the valve means comprising a valve seat and a valve closure element; and
an actuating means which provides a biasing force urging the valve closure element against the valve seat to close the valve, thereby preventing an injected fluid from passing through the valve;
characterised in that the valve will open, in use, only when the force on the valve closure element due to the pressure of the injected fluid is greater than the biasing force.

The actuating means may be selected so as to close the valve, in use, whenever the pressure of the injected fluid falls below a pre-set value that is dependent on the depth of the injection well. As discussed above, the pre-set value is typically in the range of 200 to 300 bara, for example, 225 to 275 bara, in particular, 240 to 255 bara.

The actuating means may comprise resilient biasing means such as a spring or a gas-filled bellows or dome. Typically, the gas-filled bellows or dome is filled with an inert gas such as nitrogen.

The valve may further comprise engagement means for fixing the valve at an intended site of use, e.g. means for attaching, preferably releasably attaching, the valve to a well wall, casing or injection tubing, in use. The engagement means may be adapted for engagement with a nipple profile within an injection tubing.

The valve may further comprise means for attaching, preferably, releasably attaching, the valve to a wireline, from which it may be suspended, when being inserted or retrieved from a well. Accordingly, the valve may be wireline retrievable.

The valve may further comprise one or more sealing elements operable to prevent fluid flow around, as opposed to through, the valve. If necessary, the sealing element(s) may be inflatable or expandable.

The valve may be used in one or more of the methods of the present invention. Additionally or alternatively, the valve may be incorporated in an injection system according to the present invention.

It should be appreciated that the use of the fluid injection control valve of the present invention may permit safe and stable injection well start-ups after a shut-in period, especially shorter shut-in periods. After longer shut-in periods an auxiliary gas supply, e.g. of nitrogen, may be required to create a backpressure downstream of the surface choke, since during such longer shut-in periods it will be necessary to close any other valves within the injection system (e.g. a downhole safety valve and valves associated with the wellhead such as master valves, wing valves and the surface choke).

Hence, if necessary, a nitrogen injection line may be provided for injecting nitrogen into the injection well downstream of the surface choke (wellhead) to create a sufficient back-pressure downstream of the surface choke during prolonged shut-in periods, thereby mitigating the risk of the $CO_2$ in the injection tubing undergoing a phase change into a gaseous state.

In order that the invention may be more readily understood, it will now be described by way of example only with reference to the accompanying drawings, in which:

BRIEF DESCRIPTION OF THE DRAWINGS

FIG. 3 is a partial cross section of a fluid injection control valve according to the invention.

DESCRIPTION OF THE EMBODIMENTS

Figure 1:
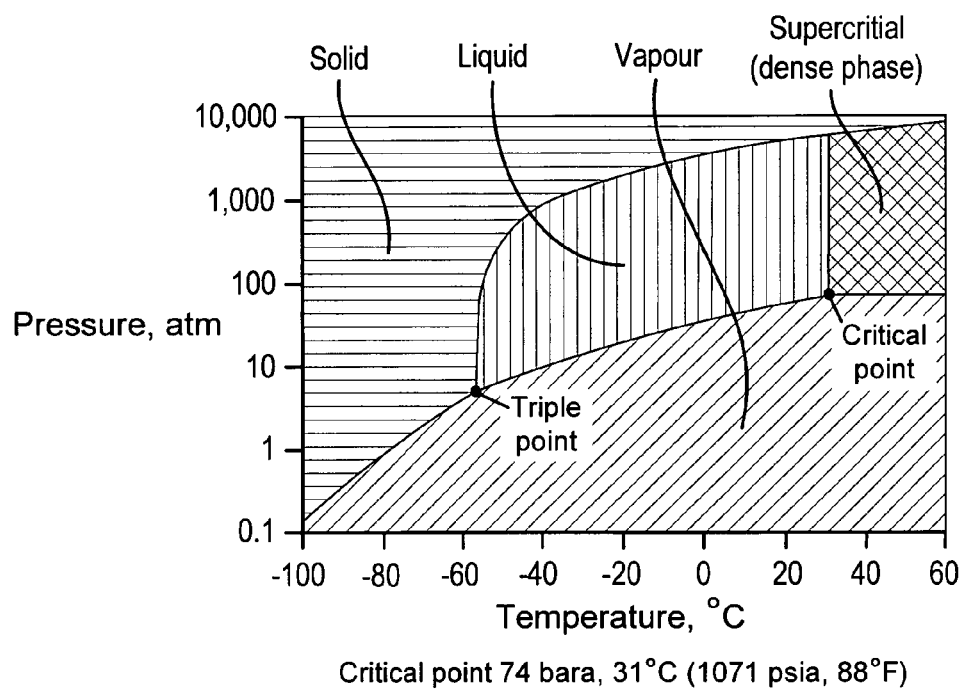
FIG. 1 is a phase diagram that shows the phase behaviour of $CO_2$.
Figure 2:
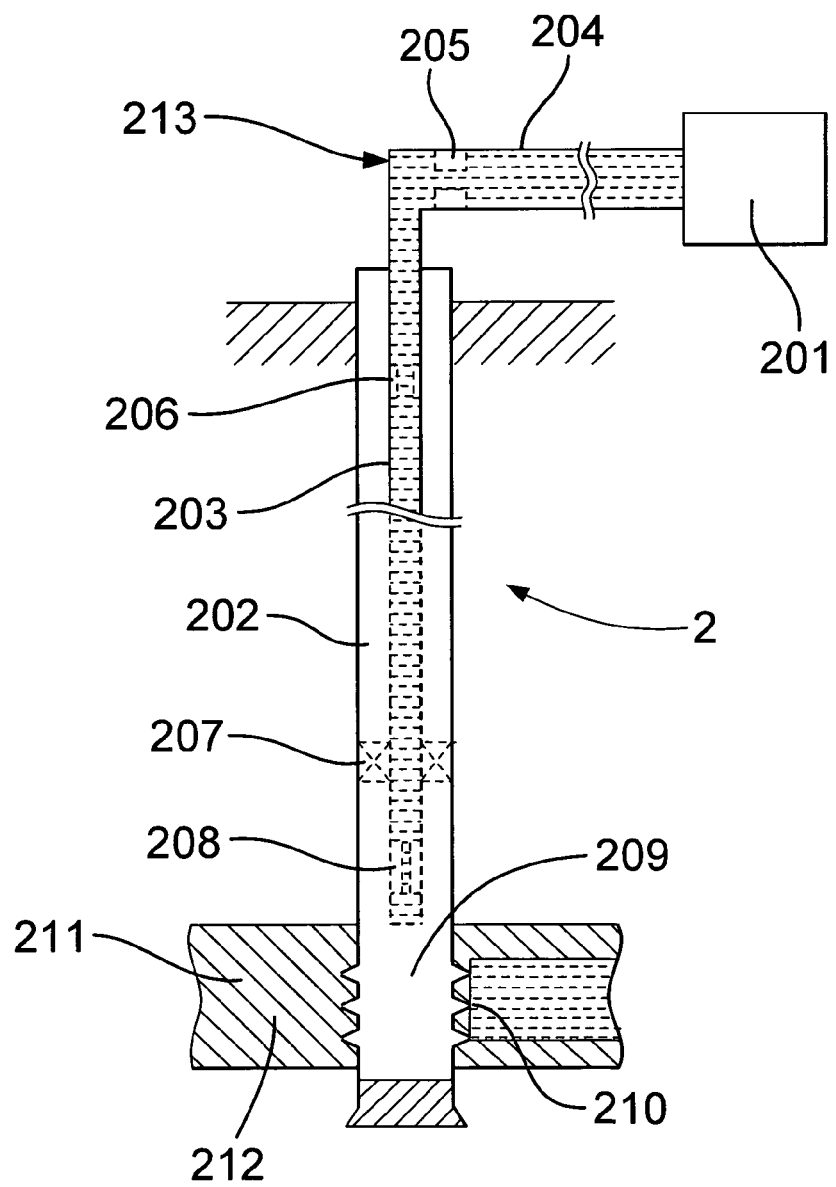
FIG. 2 shows a $CO_2$ injection system according to the present invention.

FIG. 2 shows a system 2 for injecting $CO_2$ into a subterranean reservoir. The system 2 comprises a well 202 lined with a casing. The well 202 extends downwardly from the surface and penetrates a depleted hydrocarbon reservoir 211. The casing is provided with perforations 210 which permit fluid flow from the well 202 into the reservoir 211. The reservoir 211 comprises a near wellbore region 212, i.e. the region of the reservoir close to the perforations 210.

The system 2 also comprises at a location on the surface a $CO_2$ pumping facility 201. The pumping facility 201 is connected to a pipeline 204, which connects the pumping facility 201 to a wellhead 213. Located within the pipeline 204 is a surface choke 205.

The wellhead 213 is located at an upper end of an injection tubing 203, which tubing 203 runs into the well 202 and leads at its lower end to an injection region 209, i.e. the region within the well 202 close to the perforations 210. A downhole safety valve 206 and a fluid injection control valve 208 are located within the tubing 203. The downhole safety valve 206 is located above and at a distance remote from the fluid injection control valve 208. The fluid injection control valve 208 is located relatively close to the lower end of the tubing 203, proximal to the depleted hydrocarbon reservoir or low pressure aquifer. The fluid injection control valve 208 is biased to a closed position, thereby preventing flow of $CO_2$ into the injection region 209 unless sufficient pressure is built up in the fluid above the fluid injection control valve 208.

The wellhead 213 comprises a series of valves (not shown), which will be familiar to the person skilled in the art, e.g. a wing valve, a swab valve, a kill wing valve and an upper and a lower master valve.

There is an annular passage between the tubing 203 and casing of the well 202. A packer 207 is provided to seal this passage; the packer 207 seals the injection region 209 from the remainder of the well 202.

At or towards its lower end, the injection tubing may preferably comprise a landing nipple (not shown) to provide a seat for the fluid injection control valve 208. The fluid injection control valve 208 may comprise a sealing member for engagement with the injection tubing at the nipple.

The injection tubing 203 may be put in place for use in the system or, alternatively, it may comprise existing tubing, e.g. tubing which was in place within the well during another injection process or hydrocarbon production. Where existing tubing can be used, this may advantageously decrease the cost of putting the system in place.

The fluid injection control valve 208 is preferably wireline retrievable. Consequently, it may be relatively quick and easy to deploy.

Optionally, the system may comprise one or more booster pumps to assist in raising the pressure of the pumped $CO_2$, e.g. on start-up, to cause the fluid injection control valve 208 to open.

The method of operation of the system will now be described. Pumping facility 201 pumps liquid or supercritical $CO_2$ along pipeline 204 and through the surface choke 205 to the wellhead 213. The pumped $CO_2$ then enters the injection tubing 203 and is pumped down the tubing 203 to the fluid injection control valve 208. The pressure of the pumped $CO_2$ above the fluid injection control valve 208 subsequently builds up; once this pressure is sufficient (the threshold pressure) to provide a large enough force, the fluid injection control valve 208 will open.

If the pressure of the pumped $CO_2$ above the fluid injection control valve 208 drops to below this threshold pressure, then the fluid injection control valve 208 will close.

When the fluid injection control valve 208 is open, the pumped $CO_2$ can flow into the injection region 209. The injection region will typically be at a considerably lower pressure than the pumped $CO_2$ within the injection tubing 203. Consequently, the pumped $CO_2$ may change into the gaseous phase as it enters the injection region 209. The packer 207 prevents any $CO_2$ from escaping from the injection region up the annular passage between the injection tubing 203 and the casing of the well 202.

The perforations 210 allow $CO_2$ to enter the depleted hydrocarbon reservoir 211. Depending on the pressure conditions, the $CO_2$ may be in the liquid or gaseous phase as it enters the reservoir 211. The $CO_2$ will then permeate into the reservoir 211 for sequestration therein.

It will be appreciated that there may be pressure differences within the reservoir 211, which affect the phase behaviour of the injected $CO_2$. In particular, as $CO_2$ injection proceeds, the pressure within the near wellbore region 212 may increase, since the rate of influx of $CO_2$ into the reservoir 211 may exceed the rate of permeation of the $CO_2$ within the reservoir. Accordingly, it may be that the $CO_2$ enters the reservoir 211 in the liquid phase, but that it becomes a gas as it permeates away from the near wellbore region 212 into more remote, lower pressure regions of the reservoir.

An example of how it is envisaged that the system would work in practice will now be provided and illustrated by reference to FIG. 2. In this example, the pumping facility 201 is located onshore, e.g. in the UK, while the reservoir 211 is approximately 3000 meters below the seabed, e.g. in the North Sea. The reservoir 211 in this example is a depleted gas reservoir with an initial reservoir pressure in the region of 200-300 psia (14-20 bara).

$CO_2$ is captured, e.g. from a power plant. The captured $CO_2$ is then transported from the capture plant to the pumping facility 201 at, for example, a pressure of 70 bara and ambient temperature, say between 0 and 20° C. in the case of the UK. Under these conditions, it will be appreciated that the $CO_2$ will be in the liquid phase.

The liquid $CO_2$ is then pumped offshore along pipeline 204 to the wellhead 213. The ambient conditions at the wellhead will depend on the temperature at the seabed, which may vary seasonally. Accordingly, the pressure at the wellhead 213 may be lower than 70 bara.

The pumped $CO_2$ will then enter the injection tubing 203, but its progress along the injection tubing 203 will be stopped, initially, by the fluid injection control valve 208, which is biased such that it is closed at injection start-up.

Accordingly, a column of $CO_2$ will build up in the injection tubing 203 above the fluid injection control valve 208. The column of $CO_2$ built up above the fluid injection control valve 208 exerts a force on the closure element of the fluid injection control valve 208. This force will increase as the pressure in the column increases due to continued pumping of $CO_2$ into the injection tubing 203.

In this example, the fluid injection control valve 208 is designed such that it will open when the pressure above the valve exceeds about 250 bara.

In this example, it will be appreciated that at typical downhole temperatures (e.g. 0 to 100° C.), $CO_2$ will be in the liquid or supercritical fluid phase at 250 bara. Accordingly, a stable column of liquid or supercritical $CO_2$ is built up in the injection tubing.

The fluid injection control valve 208 opens allowing $CO_2$ to flow into the injection region 209 in the liquid or supercritical fluid phase. The $CO_2$ then passes through the perforations 210 into the reservoir 211.

In this example, if the pressure of $CO_2$ above the fluid injection control valve 208 should fall below about 250 bara, then the fluid injection control valve 208 will close. Hence, the fluid injection control valve 208 prevents a phase change of the $CO_2$ out of the liquid or supercritical fluid state into the gas phase from occurring in the injection tubing 203, which would be undesirable as it would cause the column of pumped $CO_2$ to become unstable.

The person skilled in the art will understand that the fluid injection control valve may be designed to open in response to any suitable pressure of $CO_2$ built up in the fluid above the valve. For instance, the fluid injection control valve may comprise resilient biasing means, which may be designed to be overcome at pressures above the valve of say 105, 110, 120, 150 bara or some other pre-determined pressure, e.g. between 100 and 500 bara, say, between 100 and 200 bara.

While the present invention has been illustrated with respect to a vertical wellbore, the person skilled in the art will appreciate that the process and system of the present invention may also be implemented in a deviated or horizontal wellbore.

The fluid injection control valve 3 shown in partial cross section in FIG. 3 comprises an elongate body of substantially circular cross-section comprising a wider upper portion 31a and a narrower lower portion 31b. Between the upper portion 31a and lower portion 31b is an intermediate tapered portion 35. The upper portion 31a has a top 32, which comprises an inlet (not shown). The tapered portion 35 comprises at least one 34 outlet. The inlet opens into a passage 33 within the upper portion 31a of the body 31. The passage 33 terminates at its lower end with a valve seat 37. The valve seat 37 is situated between the inlet and the or each outlet. The valve seat 37 is adapted to receive a valve closure element 38 to prevent fluid flow to the or each outlet.

The valve closure element 38 is attached to a shaft 39. The shaft 39 extends downwardly from the valve closure element 38 within the lower portion 31b of the body. Collectively, the valve closure element 38 and the shaft 39 may be termed a poppet. The shaft 39 extends between the valve closure element 38a nitrogen-filled metallic bellows 36 located in a lower part of the lower portion 31b.

The pressure of the nitrogen contained within the metallic bellows 36 biases the poppet such that valve closure element 38 will engage with valve seat 37, thereby shutting off fluid flow through the valve, unless sufficient fluid pressure is built up above the valve.

FIG. 3 shows the fluid injection control valve 3 in an open state. The direction of $CO_2$ flow into and out of the valve 3 is indicated by the solid arrows.

In use, the valve 3 will be installed downhole, preferably in sealing engagement with a lower portion of an injection tubing, whereby a seal is formed between the upper portion 31a and the injection tubing. $CO_2$ flowing from the or each outlet will be able to flow in the space around the lower portion 31b of the body of the valve, e.g. an annular space between lower portion 31b of the body of the valve 3 and the injection tubing.

The valve according to the present invention is particularly suitable for use in injecting liquid or supercritical fluid $CO_2$. As will be appreciated, low temperature fluids such as this place certain demands on the valve, in particular as regards the choice of materials. For example, when certain parts of the valve, e.g. the housing, are made from metal, appropriate metallurgies need to be selected such as machinable stainless steel or chromium or nickel alloy steels. Also, the choice of materials for valve seals needs to be appropriate for use with low temperature fluids, specifically $CO_2$.

Based on anticipated well conditions, the typical operating parameters for injection of liquid $CO_2$ into a depleted hydrocarbon e.g. gas reservoir, are similar to those given in Table 1 below.

TABLE 1

| $CO_2$ injection operating parameters | | | |
|---|---|---|---|
| Upstream (above the valve) Temperature (deg C.) | 100 | Downstream (below the valve) Temperature (deg C.) | −60 |
| Upstream (above the valve) Pressure (psia) | 3500 | Downstream (below the valve) Pressure (psia) | 300 |
| Injection flowrate Qg max (mmscfd) | 100 | Injection flowrate Qg min (mmscfd) | 10 |

Further, while the invention has been described having regard to the injection and subsequent storage of $CO_2$ in a depleted hydrocarbon reservoir, it is envisaged that the principles of the invention will have utility in any situation where it is desired to maintain injection stability while injecting into a low pressure system. In particular, a low pressure system may be understood to mean any system, the pressure of which is below the critical pressure, $P_c$, of the to-be-injected fluid at a given temperature. For instance, in the case of injecting liquid phase or supercritical fluid $CO_2$ into a depleted gas reservoir, the reservoir pressure will be less than $P_c$ ($CO_2$) for the temperature of the fluid.

The invention claimed is:

1. A method of injecting $CO_2$ into an aquifer or a depleted hydrocarbon reservoir via at least one injection well that penetrates said aquifer or reservoir, wherein the injection well is provided with an injection tubing that is in sealing engagement with the injection well and wherein the pressure of the aquifer or the reservoir pressure of the depleted hydrocarbon reservoir is less than the critical pressure of $CO_2$, which method comprises:

operating an injection facility to inject a $CO_2$ stream down the injection tubing of the injection well at above the critical pressure of $CO_2$ at a given temperature, the stream being in a liquid state or a supercritical state;

wherein the injection tubing terminates at or immediately above the interval of the aquifer or the reservoir into which the $CO_2$ is to be injected and the injection tubing is provided with a fluid injection control valve at or near the bottom thereof which is closed or closes when the pressure above the valve is less than a pre-set pressure value and opens or reopens when the pressure above the valve is at or greater than said pre-set pressure value, the pre-set pressure value being selected such that the $CO_2$ in the injection tubing is maintained in a liquid or supercritical state.

2. A method as claimed in claim 1 wherein the fluid injection control valve is a one-way valve that incorporates a resiliently-biased element that actuates a valve element such that the valve opens at or above the pre-set pressure value and closes below the pre-set pressure value.

3. A method as claimed in claim 2 wherein the pre-set pressure value is in the range of 2900 to 4351 psia.

4. A method as claimed in claim 1 wherein the pre-set pressure value is in the range of 2900 to 4351 psia.

5. A method as claimed in claim 1 wherein a sealing means is provided at or near the bottom of the injection tubing such that the injection tubing is in sealing engagement with the wall of the injection well.

6. A method as claimed in claim 1 wherein a plurality of injection wells and a plurality of production wells penetrate a depleted hydrocarbon reservoir and the production wells either remain in production during injection of the $CO_2$ into the depleted hydrocarbon reservoir or the production wells are shut-in or abandoned.

7. A method as claimed in claim 1 wherein the fluid injection control valve is wireline retrievable and seats, in use, in a nipple provided in the injection tubing and wherein the fluid control valve is retrieved from the injection well once the pressure in the near wellbore region of the aquifer or reservoir has increased to a value of above about 1000 psia.

8. A system for injecting $CO_2$ into an aquifer or a depleted hydrocarbon reservoir, the system comprising:
   an injection well that penetrates the reservoir or aquifer, the injection well being provided with an injection tubing that is in sealing engagement with the wall of the injection well at or near the bottom of the injection tubing;
   a fluid injection interval located within the injection well, proximal to the hydrocarbon reservoir or aquifer;
   an injection facility for pumping a $CO_2$ stream comprising liquid or supercritical $CO_2$ into the injection well and down the injection tubing;
   wherein the injection tubing terminates within or immediately above the fluid injection interval and the system further comprises a fluid injection control valve located within the injection tubing at or near the bottom thereof, the fluid injection control valve being adapted to be closed or to close when the pressure above the valve is less than a pre-set pressure value and to be open or to reopen when the pressure above the valve is at or greater than said pre-set pressure value, the pre-set pressure value being selected such that the $CO_2$ in the injection tubing is maintained in a liquid or supercritical state.

9. A system according to claim 8, wherein the valve includes a movable member, movable between a closed position in which it effects closing of the valve, and an open position in which the valve is open.

10. A system according to claim 9, where the member is arranged such that in use the $CO_2$ stream applies a force directly to a part of the movable member and if the applied force is above a threshold, the movable member is moved to an open position, or remains in the open position, and if the applied force is below the threshold, the movable member is remains in the closed position, or is moved to the closed position.

11. A system according to claim 10, where the movable member is biased to the closed position.

12. A system according to claim 9, where the movable member is biased to the closed position.

13. A system as claimed in claim 8 wherein the injection tubing is provided with a sealing means, for example, a packer, that seals the annular space between the bottom of the injection tubing and the wall of the injection well.

14. A system as claimed in claim 8 wherein the injection well is provided with a wellhead and the $CO_2$ is delivered from the injection facility to the injection well via an injection flowline that terminates at the wellhead.

15. A system as claimed in claim 8 wherein the system additionally comprises at least one downhole safety valve and a choke valve wherein the choke valve is located in the wellhead.

16. A system for injecting $CO_2$ into a low pressure hydrocarbon reservoir or a low pressure aquifer comprising:
   an injection well that penetrates the reservoir or aquifer, the injection well being provided with an injection tubing that is in sealing engagement with the wall of the injection well at or near the bottom of the injection tubing;
   a fluid injection interval located within the injection well, proximal to the hydrocarbon reservoir or aquifer;
   an injection facility for pumping a $CO_2$ stream comprising liquid or supercritical $CO_2$ into the injection well and down the injection tubing;
   wherein the injection tubing terminates within or immediately above the fluid injection interval and the system further comprises a fluid injection control valve located within the injection tubing at or near the bottom thereof, the fluid injection control valve comprising a valve closure element, a valve seat and an actuating means wherein the actuating means provides a biasing force to the valve closure element which force is capable of being counteracted or exceeded by the force applied to the valve closure element by a column of liquid or supercritical $CO_2$ in the injection tubing and wherein the valve closes, in use, when the force applied by the column of liquid or supercritical $CO_2$ in the injection tubing is less than the biasing force provided by the actuating means such that the valve closure element is urged by the actuating means into engagement with the valve seat, thereby preventing the injected $CO_2$ from reaching the fluid injection interval of the injection well, and the valve opens, in use, when the force applied by the column of liquid or supercritical $CO_2$ in the injection tubing is greater than or equal to the biasing force.

17. A method of injecting $CO_2$ into an aquifer or a depleted hydrocarbon reservoir via at least one injection well that penetrates said aquifer or reservoir, wherein the injection well is provided with an injection tubing that is in sealing engagement with the injection well and wherein the pressure of the aquifer or the reservoir pressure of the depleted hydrocarbon reservoir is less than the critical pressure of $CO_2$, which method comprises:
   operating an injection facility to inject a $CO_2$ stream down the injection tubing of the injection well at above the critical pressure of $CO_2$, the stream being in a liquid state or a supercritical state;
   wherein the injection tubing terminates at or immediately above the interval of the aquifer or the reservoir into which the $CO_2$ is to be injected and the injection tubing is provided with a fluid injection control valve at or near the bottom thereof which is closed or closes when the pressure above the valve is less than a pre-set pressure value and opens or reopens when the pressure above the valve is at or greater than said pre-set pressure value, the pre-set pressure value being selected such that the $CO_2$ in the injection tubing is maintained in a liquid or supercritical state and wherein the fluid injection control valve is wireline retrievable and seats, in use, in a nipple provided in the injection tubing and wherein the fluid control valve is retrieved from the injection well once the pressure in the near wellbore region of the aquifer or reservoir has increased to a value of above about 1000 psia.

\* \* \* \* \*